(12) United States Patent
Weng et al.

(10) Patent No.: US 11,112,538 B2
(45) Date of Patent: Sep. 7, 2021

(54) HEAT TREATABLE COATED ARTICLE HAVING COATINGS ON OPPOSITE SIDES OF GLASS SUBSTRATE

(71) Applicants: GUARDIAN GLASS, LLC, Auburn Hills, MI (US); GUARDIAN EUROPE S.A.R.L., Bertrange (LU)

(72) Inventors: Jian-gang Weng, Canton, MI (US); Adam Burghardt, Monroe, MI (US); Ting Huang, Gibraltar, MI (US); Xuequn Hu, Northville, MI (US); Cyrus Baker, Maumee, OH (US); Suresh Devisetti, Canton, MI (US); Gyorgy Vikor, Oroshaza (HU)

(73) Assignees: GUARDIAN GLASS, LLC, Auburn Hills, MI (US); GUARDIAN EUROPE S.A.R.L., Bertrange (LU)

( * ) Notice: Subject to any disclaimer, the term of this patent is extended or adjusted under 35 U.S.C. 154(b) by 801 days.

(21) Appl. No.: 15/422,681

(22) Filed: Feb. 2, 2017

(65) Prior Publication Data

US 2018/0217296 A1 Aug. 2, 2018

(51) Int. Cl.
*G02B 1/11* (2015.01)
*C03C 17/34* (2006.01)
(Continued)

(52) U.S. Cl.
CPC .............. *G02B 1/11* (2013.01); *C03B 27/012* (2013.01); *C03C 17/3417* (2013.01);
(Continued)

(58) Field of Classification Search
CPC ....... G02B 1/11; G02B 5/208; C03C 17/3417; C03C 2218/365; C03C 2218/154;
(Continued)

(56) References Cited

U.S. PATENT DOCUMENTS 6,689,475 B1 2/2004 Lin
6,782,718 B2 8/2004 Lingle et al.
(Continued)

FOREIGN PATENT DOCUMENTS

EP 2 886 205 6/2015
JP 2011168477 A 9/2011
(Continued)

OTHER PUBLICATIONS

Office Action received for EP Application No. 18705530.6, dated Apr. 16, 2021, 6 pages.

*Primary Examiner* — Michael Zhang

(57) ABSTRACT

A first coating is provided on a first side of a glass substrate, and a second coating is provided on a second side of the glass substrate, directly or indirectly. The coatings are designed to reduce color change of the overall coated article, from the perspective of a viewer, upon heat treatment (e.g., thermal tempering and/or heat strengthening) and/or to have respective reflective coloration that substantially compensates for each other. For instance, from the perspective of a viewer of the coated article, the first coating may experience a positive a* color value shift due to heat treatment (HT), while the second coating experiences a negative a* color shift due to the HT. Thus, from the perspective of the viewer, color change due to HT (e.g., thermal tempering) can be reduced or minimized, so that non-heat-treated versions and heat treated versions of the coated article appear similar to the viewer.

37 Claims, 4 Drawing Sheets

(51) Int. Cl.
*C03B 27/012* (2006.01)
*G02B 5/20* (2006.01)

(52) U.S. Cl.
CPC ........ *G02B 5/208* (2013.01); *C03C 2217/212* (2013.01); *C03C 2217/218* (2013.01); *C03C 2217/22* (2013.01); *C03C 2217/73* (2013.01); *C03C 2218/154* (2013.01); *C03C 2218/365* (2013.01)

(58) Field of Classification Search
CPC .......... C03C 2217/22; C03C 2217/218; C03C 2217/73; C03C 2217/212; C03B 27/012
See application file for complete search history.

(56) References Cited

U.S. PATENT DOCUMENTS

| | | |
|---|---|---|
| 9,163,150 B2 | 10/2015 | Broadway et al. |
| 9,221,713 B2 | 12/2015 | Lage et al. |
| 2003/0224181 A1 | 12/2003 | Finley et al. |
| 2011/0157703 A1* | 6/2011 | Broadway ............ C03C 17/3435 359/586 |
| 2018/0265403 A1* | 9/2018 | Kawahara ............... G02B 1/115 |

FOREIGN PATENT DOCUMENTS

| | | |
|---|---|---|
| WO | WO 2008/081828 | 7/2008 |
| WO | WO 2015/183681 | 12/2015 |
| WO | 2017094867 A1 | 6/2017 |

* cited by examiner

HEAT TREATABLE COATED ARTICLE HAVING COATINGS ON OPPOSITE SIDES OF GLASS SUBSTRATE

This invention relates to a coated article including a glass substrate. A first coating is provided on a first side of the glass substrate, and a second coating is provided on the second side of the glass substrate. The coatings are designed to reduce color change of the overall coated article, from the perspective of a viewer, upon heat treatment (e.g., thermal tempering), and/or to have respective reflective coloration that substantially compensate for each other to render the overall coated article for neutral in appearance to an intended viewer. The coatings may be antireflective (AR) coatings in certain example embodiments. For example, from the perspective of a viewer of the coated article, the first and second coatings may experience different respective visible reflective color changes upon heat treatment (HT) which substantially offset each other, so that the coated article looks similar to the viewer with respect to color both before and after such heat treatment. Thus, from the perspective of the viewer, visible color change due to HT (e.g., thermal tempering) can be reduced or minimized, so that non-heat-treated versions and heat treated versions of the coated article appear similar to the viewer. Such coated articles may be used in the context of monolithic windows, storefront windows, museum glass showcases, picture frame glass, retail display case windows, table tops, insulating glass (IG) window units, laminated windows, and/or other suitable applications.

BACKGROUND AND SUMMARY OF THE INVENTION

Coated articles having double sided AR coatings comprise first and second AR coatings on opposite sides of a glass substrate. Such coated articles are often subjected to heat treatment such as thermal tempering. Unfortunately, such coated articles have substantially different appearances with respect to color before and after heat treatment, respectively (high reflective ΔE* values). In other words, the heat treatment causes significant change in reflective coloration of the coated article. This is undesirable because non-heat-treated and heat treated coated articles will have significantly different appearances from the perspective of a viewer.

Moreover, it has been found that it is particularly difficult to design a given AR coating to have a low reflective ΔE* value. In other words, it has been found that it is difficult to design AR coatings to have low reflective color shift upon heat treatment such as thermal tempering.

Thus, it would be desirable to provide a coated article, such as a double sided AR coated article with AR coatings on both sides of a glass substrate, where the coated article has reduced color shift upon heat treatment such as thermal tempering.

Example embodiments of this invention relate to a coated article including a glass substrate, where a first coating is provided on a first side of the glass substrate and a second coating is provided on the second side of the glass substrate. The coatings may be provided directly, or indirectly, on the glass substrate. The coatings are designed to reduce color change of the overall coated article, from the perspective of a viewer, upon heat treatment (e.g., thermal tempering), and/or to have respective reflective colorations that substantially compensate for each other to render the overall coated article for neutral in appearance to an intended viewer. The coatings may be antireflective (AR) coatings in certain example embodiments. For example, from the perspective of a viewer of the coated article, the first and second coatings may experience different respective visible reflective color changes upon heat treatment (HT) which substantially offset or substantially compensate each other, so that the coated article looks similar to the viewer with respect to color both before and after such heat treatment. In certain example embodiments, the first coating may have a positive reflective a* value and the second coating may have a negative reflective a* value, before and/or after HT, in order to compensate for each other in the overall product. In certain example embodiments, from the perspective of a viewer of the coated article, the first coating may experience a reflective a* color value shift in a first direction due to heat treatment (HT), and the second coating may experience a reflective a* color shift in a second direction (positive or negative) substantially opposite to the first direction due to the HT. For instance, from the perspective of a viewer of the coated article, the first coating may experience a positive reflective a* color value shift due to HT, while the second coating experiences a negative reflective a* color shift due to the HT. Thus, from the perspective of the viewer, visible color change due to HT (e.g., thermal tempering) can be reduced or minimized, so that non-heat-treated versions and heat treated versions of the coated article appear similar to the viewer. In certain example embodiments, the first and second coatings are designed so that the coated article realizes substantially neutral color, from the perspective of a viewer, both before and after HT.

In an example embodiment of this invention, there is provided a method of making a transparent coated glass product, the method comprising: having a coated article comprising a first coating provided on a first side of a glass substrate and a second coating provided on a second side of the glass substrate, so that the glass substrate is located between at least the first and second coatings; and heat treating the coated article at a temperature of at least 580 degrees C. so that the heat treating (i) causes the first coating on the glass substrate to realize a reflective a* color value shift in a positive direction from the perspective of an intended viewer due to the heat treating, and (ii) causes the second coating on the glass substrate to realize a reflective a* color value shift in a negative direction from the perspective of the intended viewer due to the heat treating.

In an example embodiment of this invention, there is provided a coated article including a first coating and a second coating supported by a glass substrate, the coated article comprising: the first coating provided on a first side of the glass substrate; the second coating provided on a second side of the glass substrate, so that the glass substrate is located between at least the first and second coatings; wherein, from the perspective of a viewer of the coated article, the first coating on the glass substrate has a positive a* reflective color, and the second coating on the glass substrate has a negative a* reflective color.

In an example embodiment of this invention, there is provided a coated article including a first coating and a second coating supported by a glass substrate, the coated article comprising: the first coating provided on a first side of the glass substrate, wherein the first coating comprise a plurality of dielectric layers having different refractive indices; the second coating provided on a second side of the glass substrate, so that the glass substrate is located between at least the first and second coatings, and wherein the second coating comprises a plurality of dielectric layers having different refractive indices; wherein the first coating on the glass substrate is configured to, upon heat treatment at a temperature of at least 580 degrees C. (e.g., thermal tempering, heat bending, and/or heat strengthening), provide a reflective a* color value shift in a positive direction from the perspective of the viewer due to the heat treatment, and the second coating on the glass substrate is configured to, upon the heat treatment, provide a reflective a* color value shift in a negative direction from the perspective of the viewer due to the heat treatment.

IN THE DRAWINGS

FIG. 3 may relate to the FIG. 1 and/or FIG. 2 embodiment(s).

DETAILED DESCRIPTION OF CERTAIN EXAMPLE EMBODIMENTS OF THE INVENTION

Figure 1:
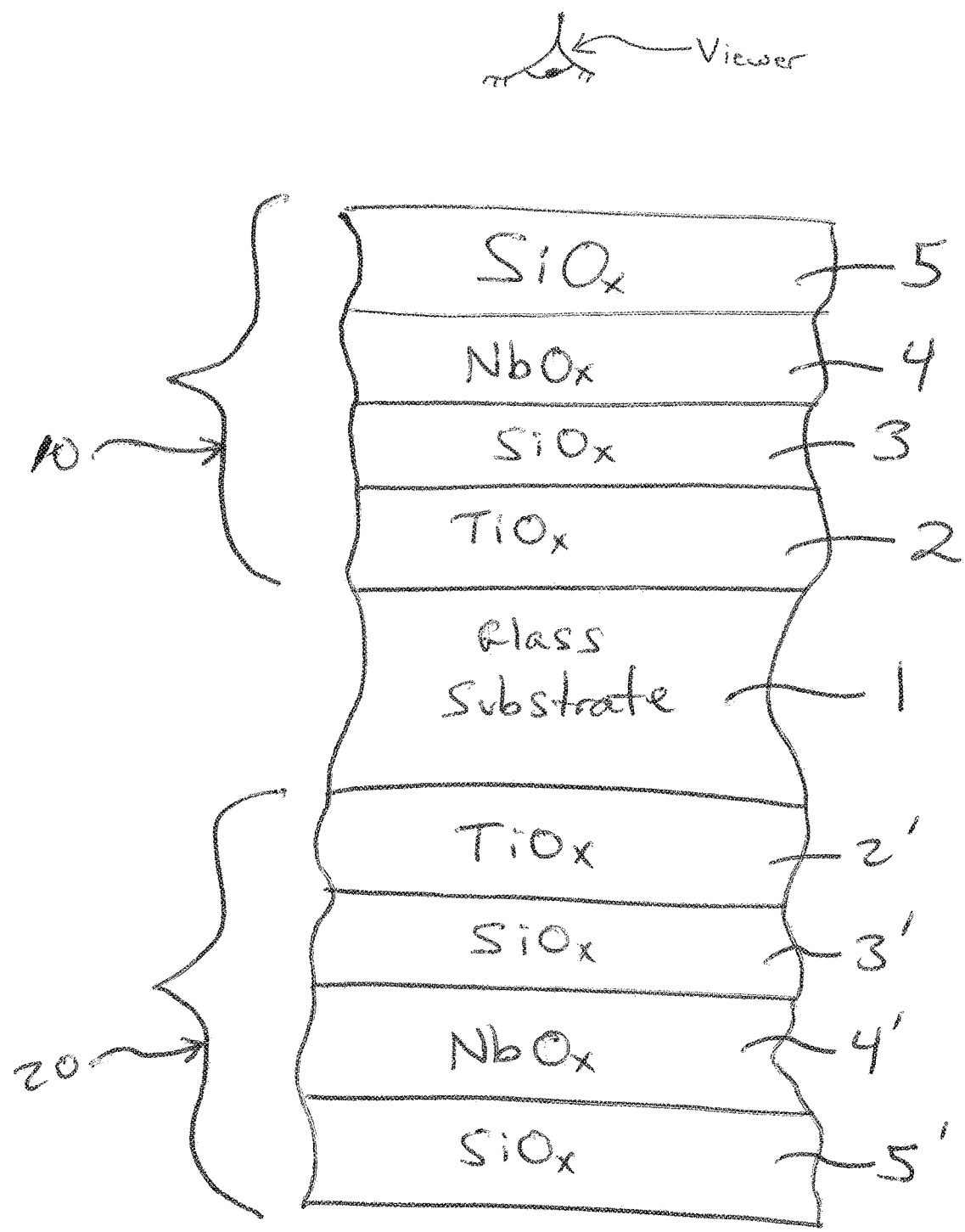
FIG. 1 is a cross sectional view of a monolithic coated article (heat treated or not heat treated) according to an example embodiment of this invention.

Referring now more particularly to the accompanying drawings in which like reference numerals indicate like parts/elements throughout the several views.

Example embodiments of this invention relate to a coated article including a glass substrate 1, where a first coating 10 (or 20) is provided on a first side of the glass substrate 1 and a second coating 20 (or 10) is provided on the second side of the glass substrate 1. The coatings 10 and 20 may be provided directly, or indirectly, on the glass substrate 1. The coatings 10 and 20 are designed to reduce color change of the overall coated article, from the perspective of a viewer, upon heat treatment (e.g., thermal tempering). The coatings 10 and 20 may be antireflective (AR) coatings in certain example embodiments. For example, from the perspective of a viewer of the coated article, the first and second coatings 10 and 20 may experience different respective visible reflective color changes upon heat treatment (HT) which substantially offset or substantially compensate each other, so that the coated article looks similar to the viewer with respect to color both before and after such heat treatment. In certain example embodiments, from the perspective of a viewer of the coated article, the first coating 10 (or 20) may have a positive reflective a* color value and the second coating 20 (or 10) may have a negative reflective a* color value, before and/or after HT, in order to compensate for each other in the overall product and allow for a substantially neutral appearance to the viewer (e.g., see FIG. 3). In certain example embodiments, from the perspective of a viewer of the coated article, the first coating 10 (or 20) may have a positive reflective b* color value and the second coating 20 (or 10) may have a negative reflective b* color value, before and/or after HT, in order to compensate for each other in the overall product and allow for a substantially neutral appearance to the viewer (e.g., see FIG. 3). In certain example embodiments, from the perspective of a viewer of the coated article, the first coating 10 (or 20) may experience a reflective a* color value shift in a first direction due to heat treatment (HT), and the second coating 20 (or 10) may experience a reflective a* color shift in a second direction (positive or negative) substantially opposite to the first direction due to the HT. For instance, from the perspective of a viewer of the coated article, the first coating 10 (or 20) may experience a positive reflective a* color value shift due to HT, while the second coating 20 (or 10) experiences a negative reflective a* color shift due to the HT (e.g., see FIG. 3). Thus, from the perspective of the viewer, visible color change due to HT (e.g., thermal tempering) can be reduced or minimized, so that non-heat-treated versions and heat treated versions of the coated article appear similar to the viewer. In certain example embodiments, the first and second coatings 10 and 20 are designed so that the coated article realizes substantially neutral color, from the perspective of a viewer, both before and after HT. The first and second coatings 10 and 20 may have the same, or different, layer stacks in different embodiments of this invention. In embodiments where the first and second coatings 10 and 20 have the same, or substantially the same, layer stacks, it has surprisingly been found that adjustment of thicknesses of particular layer(s) can be used to cause the coatings to have different reflective color shift upon HT so that from the perspective of a viewer of the coated article the first coating 10 (or 20) may experience a positive reflective a* color value shift due to HT while the second coating 20 (or 10) experiences a negative reflective a* color shift due to the HT. Such coated articles may be used in the context of monolithic windows, storefront windows, museum glass showcases, picture frame glass, retail display case windows, table tops, insulating glass (IG) window units, laminated windows, and/or other suitable applications.

Typical AR coatings themselves mostly have non-neutral reflective coloration such as blue, purple or pink coloration, and thus cannot themselves achieve reflective neutral coloration. Moreover, the non-neutral coloration of typical AR coatings becomes worse after HT such as thermal tempering. Thus, example embodiments of this invention relate to an anti-reflective coating article which can achieve reflective neutral visible coloration, both before and after heat treatment such as thermal tempering, which is advantageous for the reasons discussed herein. This is achieved in example embodiments of this invention by provide two AR coatings 10, 20 on opposite sides of the glass substrate 1, where the reflective coloration of the two AR coatings compensate for each other both before and after optional HT.

Figure 2:
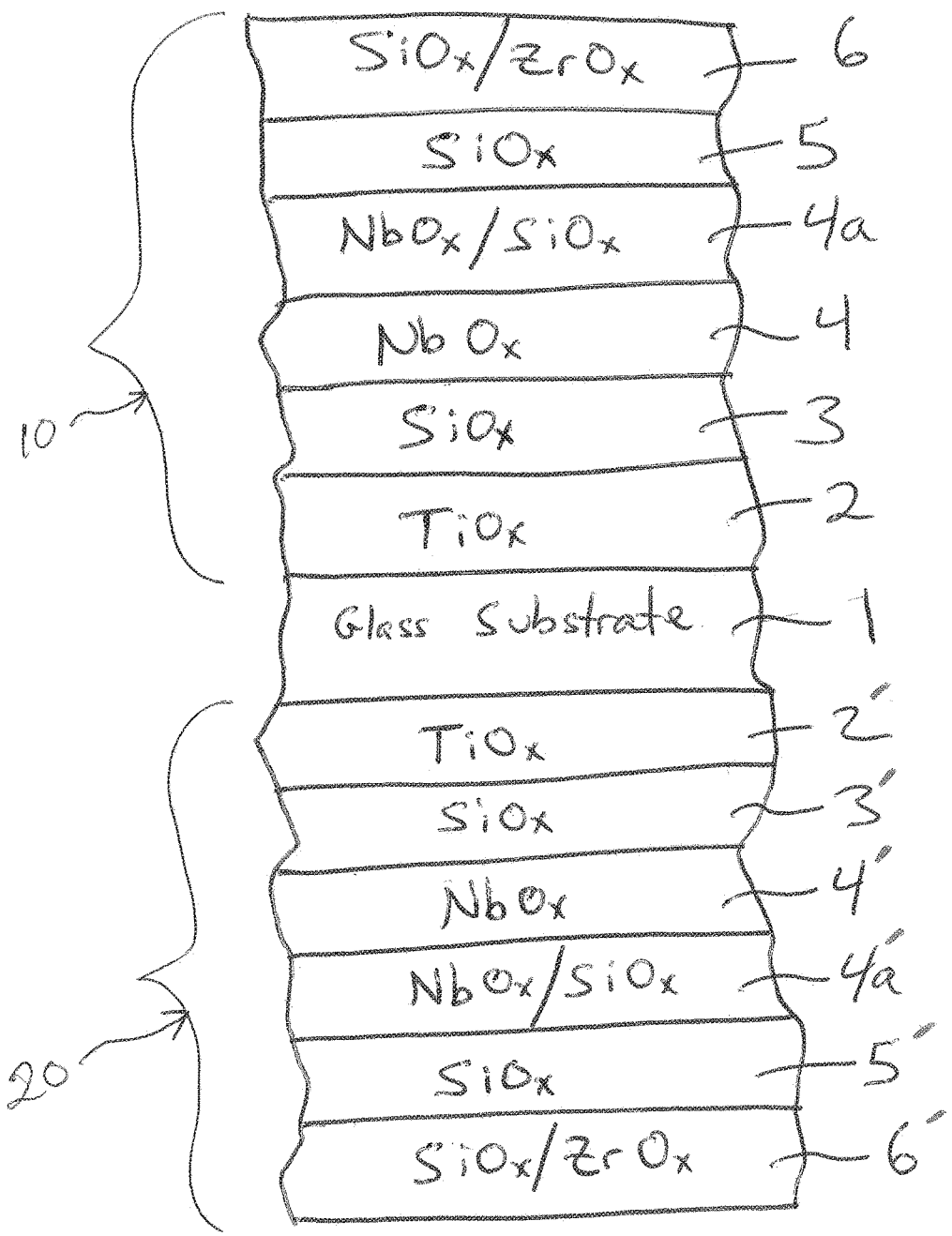
FIG. 2 is a cross sectional view of a monolithic coated article (heat treated or not heat treated) according to another example embodiment of this invention.
Figure 3:
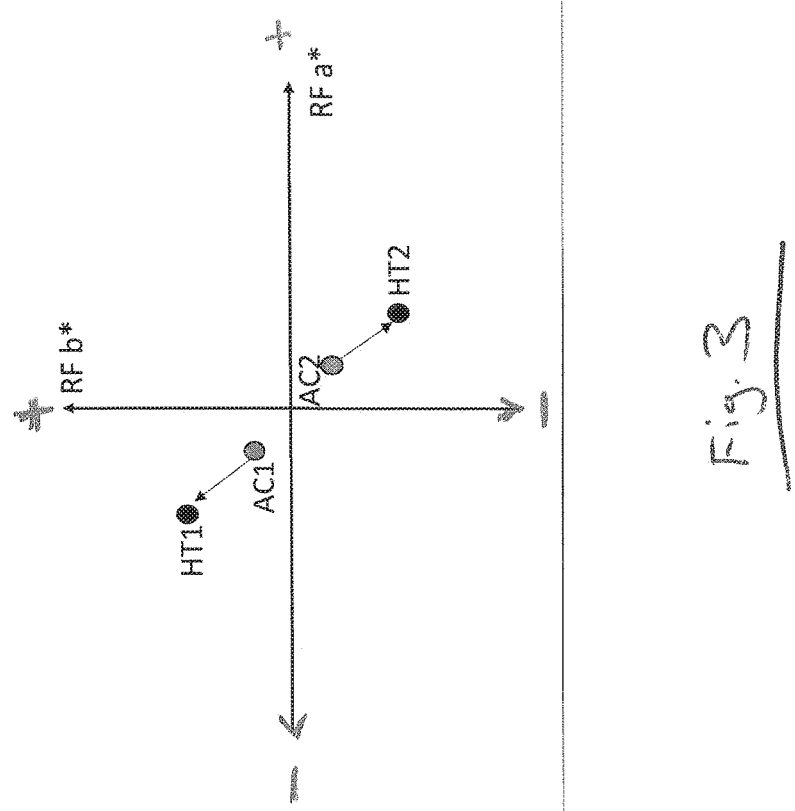
FIG. 3 is a color graph illustrating how first and second coatings, on opposite sides of the glass substrate, experience color shifts in opposite or substantially opposite directions due to heat treatment from the perspective of a viewer of the coated article.
Figure 4:
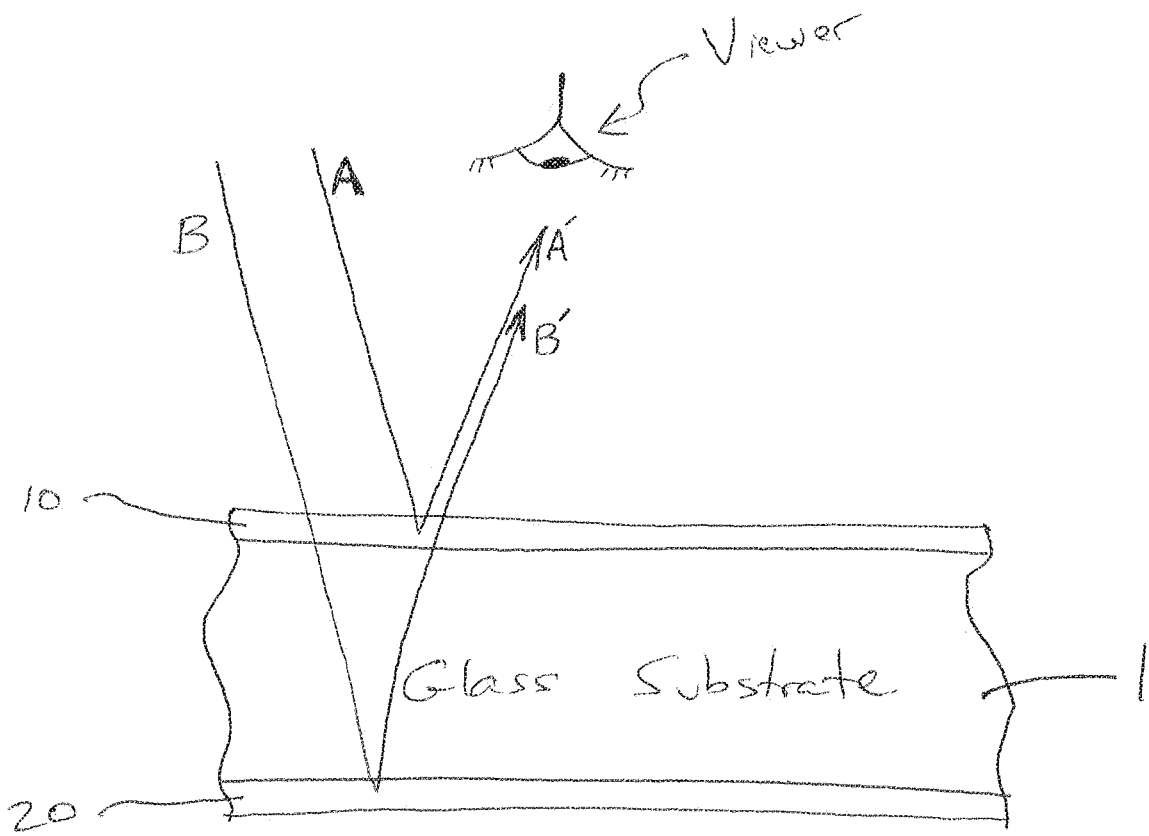
FIG. 4 is a side cross sectional view of the FIGS. 1 and 2 embodiments, illustrating reflective visible light from the two coatings that are viewed by the viewer.

FIG. 4 is a cross sectional view of an example embodiment of this invention, applicable to FIGS. 1-3. In FIG. 4, a first coating 10 (or 20) is provided on a first side of the glass substrate 1 and a second coating 20 (or 10) is provided on the second side of the glass substrate 1. Coating 10 causes a portion of the visible light incident upon the coated article to be reflected by the coated article toward the viewer as light A', and coating 20 causes a portion of the visible light incident upon the coated article which passes through coating 10 and glass substrate 1 to be reflected back toward the viewer as light B'. Example embodiments of this invention design coatings 10 and 20 so that they are complimentary coating, such that the coated article realizes substantially neutral reflective color, when reflected light A' and reflected light B' are combined, in both heat treated and non-heat-treated applications with the same coatings. The coatings 10 and 20 may be designed to have opposite reflective color shifts (e.g., opposite a* and/or b* color shifts) upon heat treatment, so that the reflective color shift upon HT of one coating 10 compensates or substantially compensates for the reflective color shift upon HT of the other coating 20. Thus, the coated article will appear similar to the viewer, with respect to visible reflected coloration, both before and after HT. This advantageously allows both HT and non-HT versions of a given coated article to be used next to each other, without having different appearances to a viewer.

In certain example embodiments, from the perspective of a viewer of the coated article, coating 10 may experience a reflective a* color value shift in a first direction due to heat treatment (HT), and the second coating 20 (or 10) may experience a reflective a* color shift in a second direction (positive or negative) substantially opposite to the first direction due to the HT. For instance, from the perspective of a viewer of the coated article, the first coating 10 (or 20) may experience a positive reflective a* color value shift due to HT, while the second coating 20 (or 10) experiences a negative reflective a* color shift due to the HT. Thus, from the perspective of the viewer, visible color change due to HT (e.g., thermal tempering) can be reduced or minimized, so that non-heat-treated versions and heat treated versions of the coated article appear similar to the viewer. In certain example embodiments, the first and second coatings 10 and 20 are designed so that the coated article realizes substantially neutral color, from the perspective of a viewer, both before and after HT. The first and second coatings 10 and 20 may have the same, or different, layer stacks in different embodiments of this invention. In embodiments where the first and second coatings 10 and 20 have the same, or substantially the same, layer stacks, it has surprisingly been found that adjustment of thicknesses of particular layer(s) can be used to cause the coatings to have different reflective color shift upon HT and/or opposite a* and/or b* values before and/or after HT, so that from the perspective of a viewer of the coated article the coated article has substantially neutral reflective coloration and/or the first coating 10 (or 20) may experience a positive reflective a* color value shift due to HT while the second coating 20 (or 10) experiences a negative reflective a* color shift due to the HT.

Coated articles may optionally be "heat treated" (HT) in certain example embodiments of this invention, and are preferably designed to be heat treatable. The terms "heat treatment", "heat treated" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

FIG. 1 is a cross sectional view of a coated article according to an example embodiment of this invention. In the FIG. 1 embodiment, antireflective (AR) coating 10 is provided on one side of glass substrate 1, and another AR coating 20 is provided on the other side of glass substrate 1. In the FIG. 1 embodiment, the materials of the respective layers of coatings 10 and 20 may be of the same material, but layer thicknesses between the two coatings may vary and in particular are designed so that the coatings have different reflective coloration values as discussed herein. In certain example embodiments, coatings 10 and 20 do not contain any infrared (IR) reflecting layer based on silver or gold. Glass substrate 1 (e.g., clear, green, bronze, grey, blue, or blue-green glass for instance) may be from about 1.0 to 12.0 mm thick, more preferably from about 4-8 mm thick, with an example glass substrate thickness being about 6 mm thick. All layers shown in FIG. 1 are transparent dielectric layers, and all may be deposited via sputter-deposition or any other suitable technique. Multi-layer AR coatings offer broad antireflection regions in the spectrum, and may for example be based on AR principles of quarter-half-quarter), where moving outwardly from the glass the coatings may each include a quarter wave medium index layer, a half wave high index layer, a quarter wave low index layer, and then air. One may replace the medium index layer with two thin layers of high and low index layers as shown in FIG. 1 for instance. Moreover, a thin hydrophobic layer may be provided over the AR coatings in certain example instances, and/or one could add a thin layer between high and low index layers to improve interfacial adhesion in certain example embodiments. AR coating 10 includes layers 2, 3, 4 and 5, whereas AR coating 20 includes layers 2', 3', 4' and 5'.

Still referring to FIG. 1, layers 2, 2', 4, and 4' are high index layers having a refractive index (n) of at least about 2.15, more preferably of at least about 2.20, and most preferably of at least about 2.25. High index layers 2, 2', 4 and 4' may each be of or including high index transparent dielectric material such as titanium oxide (e.g., $TiO_x$, where x is from 1.5 to 2.0, more preferably from 1.8 to 2.0, with an example being $TiO_2$) or niobium oxide (e.g., $NbO_x$ where x is from 1.4 to 2.1, more preferably from 1.5 to 2.0, with examples being $Nb_2O_5$ and $NbO_2$). Note that all refractive index (n) values discussed herein are at a wavelength of 550 nm. Layers 3, 3', 5 and 5' are low index layers having a refractive index (n) of less than about 1.8, more preferably less than about 1.7, and most preferably less than about 1.6. Low index layers 3, 3', 5 and 5' may each be of or including low index transparent dielectric material such as silicon oxide (e.g., $SiO_2$) or any other suitable low index material. The silicon oxide (e.g., $SiO_2$) of any of layers 3, 3', 5 and/or 5' may be doped with other materials such as aluminum (Al) and/or nitrogen (N) in certain example embodiments of this invention. For example and without limitation, any of layers 3, 3', 5 and/or 5' may be of or including silicon oxide (e.g., $SiO_2$) and include from about 0-8% (more preferably from 1-5%) Al and/or from about 0-10% (more preferably from about 1-5%) N. Likewise, the titanium oxide and/or niobium oxide of the high index layers may also be doped with other materials in certain example embodiments. As discussed above, it is possible for the combination of layers 2 and 3 (or 2' and 3') to be replaced with a medium index layer having a refractive index (n) of from 1.70 to 2.10, more preferably from 1.75 to 2.0, and even more preferably from 1.75 to 1.95. In certain example embodiments, it is possible for each of the layers to include other materials such as dopants. It will be appreciated of course that other layers may also be provided, or certain layers may be omitted, and different materials may be used, in certain alternative embodiments of this invention.

It is noted that the terms "oxide" and "nitride" as used herein include various stoichiometries. For example, the term silicon oxide includes stoichiometric $SiO_2$, as well as non-stoichiometric silicon oxide. As another example, the term titanium oxide includes stoichiometric $TiO_2$, as well as non-stoichiometric titanium oxide.

Generally, other layer(s) may also be provided in other locations of the coatings. Thus, while the coatings 10 and 20 or layers thereof is/are "on" or "supported by" substrate 1 (directly or indirectly), other layer(s) may be provided therebetween. Thus, for example, a layer or coating is considered "on" the substrate 1 even when other layer(s)

may be provided therebetween (i.e., the terms "on" and "supported by" as used herein are not limited to directly contacting). However, there may be the direct contacts shown in FIGS. 1 and 2 in preferred embodiments.

Turning back to the FIG. 1 embodiment, various thicknesses may be used consistent with one or more of the needs discussed herein. According to certain example embodiments of this invention, example thicknesses (in angstroms) and materials for the respective layers of the FIG. 1 embodiment on the glass substrate 1 are as follows in certain example embodiments for achieving desired visible transmission, low visible reflection, fairly neutral reflective coloration, and desired reflective color shift upon optional HT (layers are listed in order moving away from the glass substrate 1). Table 1 provides example materials and thicknesses for AR coating 10, and Table 2 provides example materials and thicknesses for AR coating 20, before and/or after optional HT.

TABLE 1

(Coating 10 Materials/Thicknesses in FIG. 1 embodiment)

| Layer | Example Range (Å) | Preferred (Å) | Most Preferred (Å) |
|---|---|---|---|
| titanium oxide (e.g., $TiO_2$; layer 2): | 40-200 Å | 60-120 Å | 80-105 Å |
| silicon oxide (e.g., $SiO_2$; layer 3): | 100-800 Å | 200-600 Å | 300-420 Å |
| niobium oxide (layer 4): | 300-2000 Å | 800-1500 Å | 1000-1300 Å |
| silicon oxide (e.g., $SiO_2$; layer 5): | 100-1500 Å | 860-1050 Å | 900-1000 Å |

TABLE 2

(Coating 20 Materials/Thicknesses in FIG. 1 embodiment)

| Layer | Example Range (Å) | Preferred (Å) | Most Preferred (Å) |
|---|---|---|---|
| titanium oxide (e.g., $TiO_2$; layer 2'): | 40-200 Å | 60-120 Å | 80-105 Å |
| silicon oxide (e.g., $SiO_2$; layer 3'): | 100-800 Å | 200-600 Å | 300-420 Å |
| niobium oxide (layer 4'): | 300-2000 Å | 800-1500 Å | 1000-1300 Å |
| silicon oxide (e.g., $SiO_2$; layer 5'): | 100-1500 Å | 700-890 Å | 750-850 Å |

Tables 1 and 2 above demonstrate that a significant difference between coatings 10 and 20 is the thickness of low index layer 5 compared to low index layer 5'. In certain example embodiments of this invention, low index layer 5 in coating 10 is physically thicker than low index layer 5' in coating 20 by at least 75 Å, more preferably by at least 100 Å, most preferably by at least 130 Å. It has surprisingly and unexpectedly been found that this thickness difference in layer 5 compared to layer 5' significantly affects visible reflective color values to such an extent that it allows for: (i) the first and second coatings 10 and 20 on glass to experience different respective visible reflective color changes upon heat treatment (HT) which substantially offset or substantially compensate each other, so that the coated article looks similar to the viewer with respect to color both before and after such heat treatment; (ii) from the perspective of a viewer of the coated article, one coating can have a positive reflective a* color value and the other coating can have a negative reflective a* color value, before and/or after HT, in order to compensate for each other in the overall product and allow for a substantially neutral appearance to the viewer; (iii) from the perspective of a viewer of the coated article, one coating can have a positive reflective b* color value and the other coating can have a negative reflective b* color value, before and/or after HT, in order to compensate for each other in the overall product and allow for a substantially neutral appearance to the viewer; (iv) from the perspective of a viewer of the coated article, one coating may experience a reflective a* color value shift in a positive direction due to HT and the other coating may experience a reflective a* color shift in a negative direction due to the HT so that visible reflective color change due to HT (e.g., thermal tempering) can be reduced or minimized so that non-heat-treated versions and heat treated versions of the coated article appear similar to the viewer. The examples discussed herein provide evidence of these unexpected and surprising results.

Before and/or after any optional heat treatment (HT) such as thermal tempering, heat bending, and/or heat strengthening, in certain example embodiments of this invention coated articles according to the FIG. 1 embodiment have color/optical characteristics as follows in Table 3 according to Illuminant C, 2 degree observer. It is noted that TY and $T_{vis}$ stand for visible transmission through the FIG. 1 coated article in Table 3, RY stands for visible reflectance of the FIG. 1 coated article from the point of view of the intended viewer in Table 3, and that the a* and b* values under RY stand for the respective CIE visible reflectance colorations of the overall FIG. 1 coated article from the point of view of the intended viewer and indicate neutral reflective coloration of the overall coated article in the FIG. 1 embodiment.

TABLE 3

Optical Characteristics (FIG. 1 coated article)

| | General | Preferred | Most Preferred |
|---|---|---|---|
| $T_{vis}$ (TY): | ≥60% | ≥70% | ≥80% (or ≥90%; or ≥95%) |
| RY: | ≤15% | ≤5% | ≤2% (or ≤1%) |
| a* | −4 to +4 | −3 to +3 | −2 to +2 |
| b* | −5 to +5 | −4 to +4 | −3 to +3 |

It can be seen from Table 3 above that the overall coated article of the FIG. 1 embodiment has high visible transmission, low visible reflectance due to the AR coatings 10 and 20, and neutral appearance from the point of view of the intended viewer. The a* and b* color values discussed herein are from the point of view of the intended viewer of the coated article.

Because both coatings 10 and 20 contribute to reflective coloration of the coated article shown in FIG. 1, we have broken out each coating alone on a glass substrate 1 for purposes of analysis and optical characteristics. For purposes of analyzing a coated article according to the FIG. 1 embodiment, this is an appropriate technique.

Table 4 sets forth optical data for coating 10 alone on a glass substrate (where coating 20 is not present) prior to HT according to certain example embodiments of this invention. Thus, Table 4 sets forth the visible transmission (TY), visible reflectance (RY), reflective a* color value, and reflective b* color value of a coated article including glass substrate 1 and coating 10, from the perspective of the intended viewer shown in FIG. 1, according to certain example embodiments of this invention. Note that coatings 10 and 20 can be interchanged with each other in certain example embodiments of this invention.

TABLE 4

Optical Characteristics (Coating 10 on glass; FIG. 1; pre-HT)

|  | General | Preferred | Most Preferred |
|---|---|---|---|
| $T_{vis}$ (TY): | ≥60% | ≥70% | ≥80% |
| RY: | ≤15% | ≤5% | ≤2% (or ≤1%) |
| a* | +0.25 to +9.0 | +0.5 to +5.0 | +1.0 to +4.0 |
| b* | −15.0 to +2.0 | −11.0 to −2.0 | −10.0 to −3.0 |

Table 5 sets forth optical data for coating 10 alone on a glass substrate (where coating 20 is not present) after HT such as thermal tempering, heat bending, and/or heat strengthening according to certain example embodiments of this invention. Thus, Table 5 sets forth the visible transmission (TY), visible reflectance (RY), reflective a* color value, and reflective b* color value of a coated article including glass substrate 1 and coating 10, from the perspective of the intended viewer shown in FIG. 1, according to certain example embodiments of this invention post-HT.

TABLE 5

Optical Characteristics (Coating 10 on glass; FIG. 1; post-HT)

|  | General | Preferred | Most Preferred |
|---|---|---|---|
| $T_{vis}$ (TY): | ≥60% | ≥70% | ≥80% |
| RY: | ≤15% | ≤5% | ≤2% (or ≤1%) |
| a* | +0.5 to +12.0 | +1.0 to +9.0 | +2.0 to +7.0 |
| b* | −17.0 to +7.0 | −12.0 to 0 | −11.0 to −1.0 |

It can be seen from Tables 4-5 that HT of a glass substrate with coating 10 thereon causes the reflective a* color value to shift in the positive direction upon HT. For example, an a* shift from +3 to +6 would be a shift in the positive direction because the a* value becomes more positive. As another example, an a* shift from −4 to −1 would be a shift in the positive direction because the a* value becomes more positive. As yet another example, an a* shift from −1 to +3 would be a shift in the positive direction because the a* value becomes more positive.

Table 6 sets forth optical data for coating 20 alone on a glass substrate (where coating 10 is not present) prior to HT according to certain example embodiments of this invention. Thus, Table 6 sets forth the visible transmission (TY), visible reflectance (RY), reflective a* color value, and reflective b* color value of a coated article including glass substrate 1 and coating 20, from the perspective of the intended viewer shown in FIG. 1, according to certain example embodiments of this invention. Note that coatings 10 and 20 can be interchanged with each other in certain example embodiments of this invention.

TABLE 6

Optical Characteristics (Coating 20 on glass; FIG. 1; pre-HT)

|  | General | Preferred | Most Preferred |
|---|---|---|---|
| $T_{vis}$ (TY): | ≥60% | ≥70% | ≥80% |
| RY: | ≤15% | ≤5% | ≤2% (or ≤1%) |
| a* | −10.0 to +2.0 | −5.0 to −0.25 | −3.0 to −0.25 |
| b* | −3.0 to +10.0 | +0.25 to +9.0 | +0.5 to +4.0 |

Table 7 sets forth optical data for coating 20 alone on a glass substrate (where coating 10 is not present) after HT such as thermal tempering, heat bending, and/or heat strengthening according to certain example embodiments of this invention. Thus, Table 7 sets forth the visible transmission (TY), visible reflectance (RY), reflective a* color value, and reflective b* color value of a coated article including glass substrate 1 and coating 20, from the perspective of the intended viewer shown in FIG. 1, according to certain example embodiments of this invention post-HT.

TABLE 7

Optical Characteristics (Coating 20 on glass; FIG. 1; post-HT)

|  | General | Preferred | Most Preferred |
|---|---|---|---|
| $T_{vis}$ (TY): | ≥60% | ≥70% | ≥80% |
| RY: | ≤15% | ≤5% | ≤2% (or ≤1%) |
| a* | −13.0 to 0 | −9.0 to −2.0 | −7.0 to −3.0 |
| b* | −2.0 to +14.0 | +0.5 to +9.0 | +1.0 to +5.0 |

Contrary to Tables 4-5, it can be seen from Tables 6-7 that HT of a glass substrate with coating 20 thereon causes the reflective a* color value to shift in the negative direction (opposite to the a* shift caused by coating 10) from the perspective of the intended viewer. For example, an a* shift from −1 to −5 would be a shift in the negative direction because the a* value becomes more negative. As another example, an a* shift from +1 to −3 would be a shift in the negative direction because the a* value becomes more negative. As yet another example, an a* shift from +5 to +1 would be a shift in the negative direction because the a* value becomes more negative.

It can also be seen from Tables 4-7 above that in preferred embodiments of this invention, coating 10 on glass provides a positive reflective a* color value to the viewer whereas coating 20 on glass provides a negative reflective a* color value to the viewer, before and/or after HT, so that the coatings compensate for each other so that the overall coated article from the perspective of the intended viewer has a more neutral coloration than the coloration caused by coating 10 alone or coating 20 alone on glass. It can also be seen from Tables 4-7 above that in preferred embodiments of this invention, coating 10 on glass provides a negative reflective b* color value to the viewer whereas coating 20 on glass provides a positive reflective b* color value to the viewer, before and/or after HT, so that the coatings compensate for each other so that the overall coated article from the perspective of the intended viewer has a more neutral coloration than the coloration caused by coating 10 alone or coating 20 alone on glass.

Likewise, FIG. 3 shows that one coating (e.g., coating 10), identified as coating "2" in FIG. 3, provides a positive reflective a* color value to the viewer whereas another coating (e.g., coating 20), identified as coating "1" in FIG. 3, provides a negative reflective a* color value to the viewer, before and after HT, so that the coatings compensate for each other so that the overall coated article from the perspective of the intended viewer has a more neutral coloration than the coloration caused by coating 10 alone or coating 20 alone. In FIG. 3, AC2 stands for as-coated coating 2 (pre-HT), and HT2 stand for heat treated coating 2. And AC1 stands for as-coated coating 1 (pre-HT), and HT1 stand for heat treated coating 1. It can also be seen in FIG. 3 that in preferred embodiments of this invention, one coating (e.g., coating 10), identified as coating "2" in FIG. 3, provides a negative reflective b* color value to the viewer whereas the other coating (e.g., coating 20) on the opposite side of the glass substrate, identified as coating "1" in FIG. 3, provides a positive reflective b* color value to the viewer, before and after HT, so that the coatings compensate for each other so that the overall coated article from the perspective of the intended viewer has a more neutral coloration than the coloration caused by coating 10 alone or coating 20 alone.

FIG. 3 also shows that HT of the glass substrate 1 with the two coatings 1 and 2 (e.g., 20 and 10) on opposite sides thereof results in one coating (e.g., coating 10), identified as coating "2" in FIG. 3, causing the reflective a* color value to shift in the positive direction (to the right in FIG. 3), and the other coating (e.g., coating 20), identified as coating "1" in FIG. 3, causing the reflective a* color value to shift in the negative direction (to the left in FIG. 3) from the perspective of the intended viewer. Again, this advantageously allows the two coatings to compensate for each other upon HT so that the overall coated article from the perspective of the intended viewer has a more neutral coloration than the coloration caused by coating 10 alone or coating 20 alone after HT.

For purposes of example only, the examples below represent different example embodiments of this invention.

EXAMPLES

Comparative Example (CE) 1 is a glass substrate 1 with AR coatings CE1a and CE1b on opposite sides thereof, whereas Example 1 is also a glass substrate 1 with AR coatings Ex. 1a and Ex. 1b on opposite sides thereof as shown in FIG. 1. Layer thicknesses below are in angstroms (Å). Example 1a is similar to coating 20 in FIG. 1, and Example 1b is similar to coating 10 in FIG. 1. "L" stands for layer in the table below, so that for example L2 stands for layer 2, L3 stands for layer 3, and so forth. The layers below move from the glass substrate 1 outward.

TABLE 8

Layer Stacks of Examples

| Example | L2/L2'(TiO$_2$) | L3/L3'(SiO$_2$) | L4/L4'(NbO$_x$) | L5/L5'(SiO$_2$) |
|---|---|---|---|---|
| Ex. 1a: | 80 Å | 353 Å | 1109 Å | 796 Å |
| Ex. 1b: | 97 Å | 389 Å | 1218 Å | 963 Å |
| CE1a: | 89 Å | 397 Å | 1202 Å | 852 Å |
| CE1b: | 88 Å | 387 Å | 1171 Å | 806 Å |

A key difference between Example 1 (with coatings 1a and 1b), compared to Comparative Example CE1 (with coatings CE1a and CE1b), on the same glass substrate 1, is the thickness of the outermost silicon oxide layer 5, 5'. In particular, the thicknesses of layers 2 and 2', 3 and 3', and 4 and 4', are similar in all examples. However, while layers 5 and 5' have similar thicknesses in coatings CE1a and CE1b of Comparative Example 1, layer 5 in Example 1 (Ex. 1b; coating 10; layer 5) at 963 Å is substantially thicker than layer 5' at 796 Å in Example 1 (Ex. 1a; coating 20; layer 5'). As explained above in connection with FIG. 1, low index layer 5 in coating 10 is physically thicker than low index layer 5' in coating 20 by at least 75 Å, more preferably by at least 100 Å, and most preferably by at least 130 Å, with an example range being from about 100-250 Å thicker, or from about 120-210 Å thicker). It has surprisingly and unexpectedly been found that this difference in thickness between layers 5 and 5' provides for a significant change in a* and b* values before and after HT, and for a different direction of a* color shift upon HT (see optical data below).

Measured monolithically, both before and after thermal tempering (HT), with a Perkin Elmer device, the coatings on the glass substrate of the examples had the following visible reflectance characteristics from the perspective of the intended viewer shown in FIG. 1. Note that all coatings had visible transmission well over 70%, before and after HT. Table 9 sets forth pre-HT data, and Table 10 sets forth post-HT data.

TABLE 9

Optical Data (Pre-HT)

| Parameter | Ex. 1a | Ex. 1b | CE1a | CE1b |
|---|---|---|---|---|
| RY(refl. %): | 0.5% | 0.4% | 0.6% | 0.7% |
| a*: | −1.84 | +1.45 | −1.71 | −1.13 |
| b*: | +2.23 | −3.97 | +2.48 | +1.57 |

It can be seen from Table 9 that, prior to HT, both coatings CE1a and CE1b of Comparative Example 1 on the glass substrate had negative reflective a* values from the perspective of the intended viewer. In contrast, the change in thickness between layers 5 and 5' mentioned above in Example 1 surprisingly and unexpectedly caused the coating Ex. 1a (coating 20) on the glass substrate to have a negative reflective a* value, but the coating Ex. 1b (coating 10) on the glass substrate to have a positive reflective a* value. Thus, in Ex. 1 the positive and negative a* values caused by the coatings 10 and 20, respectively, substantially compensate for each other so that the overall coated article (see FIG. 1) with both coatings thereon appears more neutral in color compared to CE1 to the viewer. In other words, Comparative Example 1 has a negative reflective a* value from the perspective of the viewer which is much further from the central origin in FIG. 3 (and thus less neutral) compared to the a* value of Example 1.

It can also be seen in Table 9 above that, prior to HT, both coatings CE1a and CE1b of Comparative Example 1 on the glass substrate had positive reflective b* values from the perspective of the intended viewer. In contrast, the change in thickness between layers 5 and 5' mentioned above in Example 1 surprisingly and unexpectedly caused the coating Ex. 1a (coating 20) on the glass substrate to have a positive reflective b* value, but the coating Ex. 1b (coating 10) on the glass substrate to have a negative reflective b* value. Thus, in Ex. 1 the positive and negative b* values caused by the coatings 20 and 10, respectively, substantially compensate for each other so that the overall coated article (see FIG. 1) with both coatings thereon appears more neutral in color compared to CE1 to the viewer. In other words, Comparative Example 1 has a positive reflective b* value from the perspective of the viewer (caused by both coatings causing a positive b* reflective color) which is much further from the central origin in FIG. 3 (and thus less neutral) compared to the reflective b* value of Example 1 where the negative b* value of coating 10 (Ex. 1b) compensates for the positive b* value of coating 20 (Ex. 1a).

After thermal tempering (HT), the example coatings had the following characteristics.

TABLE 10

Optical Data (Post-HT)

| Parameter | Ex. 1a | Ex. 1b | CE1a | CE1b |
|---|---|---|---|---|
| RY(refl. %): | 0.6% | 0.5% | 0.8% | 1.0% |
| a*: | −3.85 | +2.30 | −3.40 | −5.10 |
| b*: | +3.10 | −1.94 | +4.52 | +3.30 |

Again, it can be seen in Table 10 that, after HT, both coatings CE1a and CE1b of Comparative Example 1 on the glass substrate had negative reflective a* values from the perspective of the intended viewer, and that the HT caused the reflective a* values to shift even further to the negative for both CE1a and CE1b. Thus, the HT caused Comparative Example 1 to shift significantly away from neutral. While Comparative Example 1 was close to neutral prior to HT with reflective a* values of −1.13 and −1.71, it is no longer close to neutral after HT because its reflective a* values have shifted well away from neutral to values of −3.40 and −5.10 which are both negative. In contrast, the change in thickness between layers 5 and 5' mentioned above in Example 1 surprisingly and unexpectedly caused the coating Ex. 1a (coating 20) on the glass substrate to have a negative reflective a* value, but the coating Ex. 1b (coating 10) on the glass substrate to have a positive reflective a* value. Moreover, the thickness change also unexpectedly caused the coating Ex. 1a (coating 20) on the glass to realize an a* color shift in the negative direction, but the coating Ex. 1b (coating 10) on the glass to realize an a* color shift in the positive direction as shown in FIG. 3. Thus, in Ex. 1 the positive and negative a* values caused by the coatings 10 and 20, respectively, substantially compensate for each other so that the overall coated article (see FIG. 1) with both coatings thereon appears more neutral in color compared to CE1 to the viewer. In other words, after HT Comparative Example 1 has a very negative reflective a* value around −4 from the perspective of the viewer which is much further from the central origin in FIG. 3 (and thus less neutral) compared to the a* value of Example 1 which would be just slightly negative as the −3.85 and +2.30 values substantially compensate for each other.

It can also be seen in Table 10 above that, after HT, both coatings CE1a and CE1b of Comparative Example 1 on the glass substrate had positive reflective b* values from the perspective of the intended viewer. In contrast, the change in thickness between layers 5 and 5' mentioned above in Example 1 surprisingly and unexpectedly caused the coating Ex. 1a (coating 20) on the glass substrate to have a positive reflective b* value, but the coating Ex. 1b (coating 10) on the glass substrate to have a negative reflective b* value. Thus, in Ex. 1 the positive and negative b* values caused by the coatings 20 and 10, respectively, substantially compensate for each other so that the overall coated article (see FIG. 1) with both coatings thereon appears more neutral in color compared to CE1 to the viewer. In other words, Comparative Example 1 has a positive reflective b* value from the perspective of the viewer (caused by both coatings causing a positive b* reflective color) which is much further from the central origin in FIG. 3 (and thus less neutral) compared to the reflective b* value of Example 1 where the negative b* value of coating 10 (Ex. 1b) substantially compensates for the positive b* value of coating 20 (Ex. 1a) to make Example 1 appears more neutral to the viewer.

FIG. 2 is a cross sectional view of a coated article according to an example embodiment of this invention. The coating stacks in the FIG. 2 embodiment are the same as in the FIG. 1 embodiment and have the same goals/purposes, except that layers 4a, 4a', 6 and 6' have been added in the FIG. 2 embodiment. Thus, in FIG. 2 antireflective (AR) coating 10 is provided on one side of glass substrate 1, and another AR coating 20 is provided on the other side of glass substrate 1. All layers shown in FIG. 2 are transparent dielectric layers, and all may be deposited via sputter-deposition or any other suitable technique. As explained above in connection with FIG. 1, in both FIGS. 1 and 2, layers 2, 2', 4, and 4' are high index layers having a refractive index (n) of at least about 2.15, more preferably of at least about 2.20, and most preferably of at least about 2.25. High index layers 2, 2', 4 and 4' may each be of or including high index transparent dielectric material such as titanium oxide or niobium oxide. And layers 3, 3', 5 and 5' are low index layers having a refractive index (n) of less than about 1.8, more preferably less than about 1.7, and most preferably less than about 1.6. Low index layers 3, 3', 5 and 5' may each be of or including low index transparent dielectric material such as silicon oxide (e.g., $SiO_2$) or any other suitable low index material. In the FIG. 2 embodiment, medium index layers 4a and 6 have been added to coating 10, and medium index layers 4a' and 6' have been added to coating 20 (compared to the FIG. 1 embodiment). In certain example embodiments of this invention, medium index layers 4a, 4a', 6 and 6' have each have a refractive index (n) of from 1.70 to 2.10, more preferably from 1.75 to 2.0, and even more preferably from 1.75 to 1.95. In certain example embodiments, medium index layers 4a and 4a' may be of a medium index material such as a combination of niobium oxide and silicon oxide (also known as niobium silicon oxide) as shown in FIG. 2, or a combination of titanium oxide and silicon oxide (also known as titanium silicon oxide), or any other suitable medium index material. In certain example embodiments, medium index layers 6 and 6' may be of a medium index material such as a combination of zirconium oxide and silicon oxide (also known as zirconium silicon oxide) as shown in FIG. 2, or any other suitable medium index material. And the zirconium in layers 6 and 6' helps improve durability of the respective coatings 10 and 20. It is also noted that stack sequences from either the FIG. 1 or FIG. 2 embodiment may be repeated, so that for example another sequence of layers 2-6 could be provided on top of the layers illustrated in each coating in FIG. 2.

In the FIG. 2 embodiment, various thicknesses may be used consistent with one or more of the needs discussed herein. According to certain example embodiments of this invention, example thicknesses (in angstroms) and materials for the respective layers of the FIG. 2 embodiment on the glass substrate 1 are as follows in certain example embodiments for achieving desired visible transmission, low visible reflection, low or fairly neutral reflective coloration, and desired reflective color shift upon optional HT (layers are listed in order moving away from the glass substrate 1). Table 11 provides example materials and thicknesses for AR coating 10, and Table 12 provides example materials and thicknesses for AR coating 20, before and/or after optional HT.

TABLE 11

(Coating 10 Materials/Thicknesses in FIG. 2 embodiment)

| Layer | Example Range (Å) | Preferred (Å) | Most Preferred (Å) |
|---|---|---|---|
| titanium oxide (e.g., $TiO_2$; layer 2): | 40-200 Å | 60-120 Å | 80-105 Å |
| silicon oxide (e.g., $SiO_2$; layer 3): | 100-800 Å | 200-600 Å | 340-420 Å |
| niobium oxide (e.g., $Nb_2O_5$; layer 4): | 200-2000 Å | 700-1400 Å | 900-1200 Å |
| niobium silicon oxide (layer 4a): | 50-900 Å | 100-800 Å | 200-300 Å |
| silicon oxide (e.g., $SiO_2$; layer 5): | 200-1000 Å | 560-700 Å | 590-650 Å |
| Zirconium silicon oxide (layer 6): | 30-400 Å | 40-200 Å | 50-150 Å |

TABLE 12

(Coating 20 Materials/Thicknesses in FIG. 2 embodiment)

| Layer | Example Range (Å) | Preferred (Å) | Most Preferred (Å) |
|---|---|---|---|
| titanium oxide (e.g., $TiO_2$; layer 2'): | 40-200 Å | 60-120 Å | 80-105 Å |
| silicon oxide (e.g., $SiO_2$; layer 3'): | 100-800 Å | 200-600 Å | 300-420 Å |
| niobium oxide (e.g., $Nb_2O_5$; layer 4'): | 200-2000 Å | 700-1400 Å | 900-1200 Å |
| niobium silicon oxide (layer 4a'): | 50-900 Å | 100-800 Å | 200-300 Å |
| silicon oxide (e.g., $SiO_2$; layer 5'): | 200-1000 Å | 370-540 Å | 400-480 Å |
| Zirconium silicon oxide (layer 6'): | 30-400 Å | 40-200 Å | 50-150 Å |

Tables 11 and 12 above demonstrate that a significant difference between coatings 10 and 20 is the thickness of low index layer 5 compared to the thickness of low index layer 5'. In certain example embodiments of this invention, low index layer 5 in coating 10 is physically thicker than low index layer 5' in coating 20 by at least 75 Å, more preferably by at least 100 Å, even more preferably by at least 130 Å, and most preferably by at least 160 Å. It has surprisingly and unexpectedly been found that this thickness difference in layer 5 compared to layer 5' significantly affects visible reflective color values to such an extent that it allows for: (i) the first and second coatings 10 and 20 on glass to experience different respective visible reflective color changes upon heat treatment (HT) which substantially offset or substantially compensate each other, so that the coated article looks similar to the viewer with respect to color both before and after such heat treatment; (ii) from the perspective of a viewer of the coated article, one coating may experience a reflective a* color value shift in a positive direction due to HT and the other coating may experience a reflective a* color shift in a negative direction due to the HT so that visible reflective color change due to HT (e.g., thermal tempering) can be reduced or minimized so that non-heat-treated versions and heat treated versions of the coated article appear similar to the viewer; and possibly (iii) from the perspective of a viewer of the coated article, one coating may experience a reflective b* color value shift in a positive direction due to HT and the other coating may experience a reflective b* color shift in a negative direction due to the HT so that visible reflective color change due to HT (e.g., thermal tempering) can be reduced. The examples discussed herein provide evidence of these unexpected and surprising results.

Before and/or after any optional heat treatment (HT) such as thermal tempering, heat bending, and/or heat strengthening, in certain example embodiments of this invention coated articles according to the FIG. 2 embodiment have color/optical characteristics as follows in Table 13 according to Illuminant C, 2 degree observer. It is noted that TY and $T_{vis}$ stand for visible transmission through the FIG. 2 coated article in Table 13, RY stands for visible reflectance of the FIG. 2 coated article from the point of view of the intended viewer in Table 13, and that the a* and b* values under RY stand for the respective CIE visible reflectance colorations of the overall FIG. 2 coated article including both coatings from the point of view of the intended viewer and indicate neutral reflective coloration of the overall coated article in the FIG. 2 embodiment.

TABLE 13

Optical Characteristics (FIG. 2 coated article)

| | General | Preferred | Most Preferred |
|---|---|---|---|
| $T_{vis}$ (TY): | ≥60% | ≥70% | ≥80% |
| RY: | ≤15% | ≤5% | ≤2% (or ≤1%) |
| a* | −7 to +7 | −5 to +5 | −3 to +3 |
| b* | −8 to +8 | −6 to +6 | −3 to +3 |

It can be seen from Table 13 above that the overall coated article of the FIG. 2 embodiment has high visible transmission, low visible reflectance due to the AR coatings 10 and 20, and generally neutral appearance from the point of view of the intended viewer. The a* and b* color values discussed herein are reflective and are from the point of view of the intended viewer of the coated article.

Still referring to the FIG. 2 embodiment, Table 14 sets forth optical data for coating 10 alone on a glass substrate (where coating 20 is not present) prior to HT according to certain example embodiments of this invention. Thus, Table 14 sets forth the visible transmission (TY), visible reflectance (RY), reflective a* color value, and reflective b* color value of a coated article including glass substrate 1 and coating 10, from the perspective of the intended viewer shown in FIG. 2, according to certain example embodiments of this invention. Note that coatings 10 and 20 can be interchanged with each other in certain example embodiments of this invention.

TABLE 14

Optical Characteristics (Coating 10 on glass; FIG. 2; pre-HT)

| | General | Preferred | Most Preferred |
|---|---|---|---|
| $T_{vis}$ (TY): | ≥60% | ≥70% | ≥80% |
| RY: | ≤15% | ≤5% | ≤2% (or ≤1%) |
| a* | −7.0 to +3.0 | −4.0 to +1.0 | −3.0 to +0.5 |
| b* | −15.0 to +7.0 | −6.0 to +4.0 | −3.0 to +1.0 |

Table 15 sets forth optical data for coating 10 alone on a glass substrate (where coating 20 is not present) after HT such as thermal tempering, heat bending, and/or heat strengthening according to certain example embodiments of this invention. Thus, Table 15 sets forth the visible transmission (TY), visible reflectance (RY), reflective a* color value, and reflective b* color value of a coated article including glass substrate 1 and coating 10, from the perspective of the intended viewer shown in FIG. 2, according to certain example embodiments of this invention post-HT.

TABLE 15

Optical Characteristics (Coating 10 on glass; FIG. 2; post-HT)

| | General | Preferred | Most Preferred |
|---|---|---|---|
| $T_{vis}$ (TY): | ≥60% | ≥70% | ≥80% |
| RY: | ≤15% | ≤5% | ≤2% (or ≤1%) |
| a* | −2.0 to +12.0 | +0.5 to +9.0 | +1.0 to +5.0 |
| b* | −17.0 to +6.0 | −7.0 to +3.0 | −3.5 to +0.5 |

It can be seen from Tables 14-15 that HT of a glass substrate with coating 10 thereon causes the reflective a* color value to shift in the positive direction upon HT. For example, an a* shift from −2 to +2 would be a shift in the positive direction because the a* value becomes more positive. As another example, an a* shift from +1 to +3 would be a shift in the positive direction because the a* value becomes more positive.

Still referring to the FIG. 2 embodiment, Table 16 sets forth optical data for coating 20 alone on a glass substrate (where coating 10 is not present) prior to HT according to certain example embodiments of this invention. Thus, Table 16 sets forth the visible transmission (TY), visible reflectance (RY), reflective a* color value, and reflective b* color value of a coated article including glass substrate 1 and coating 20, from the perspective of the intended viewer shown in FIG. 2, according to certain example embodiments of this invention. Note that coatings 10 and 20 can be interchanged with each other in certain example embodiments of this invention.

TABLE 16

Optical Characteristics (Coating 20 on glass; FIG. 2; pre-HT)

| | General | Preferred | Most Preferred |
|---|---|---|---|
| $T_{vis}$ (TY): | ≥60% | ≥70% | ≥80% |
| RY: | ≤15% | ≤5% | ≤2% (or ≤1%) |
| a* | −10.0 to +5.0 | −5.0 to −+1.0 | −3.0 to 0 |
| b* | −12.0 to +10.0 | −5.0 to +5.0 | −2.0 to +2.0 |

Table 17 sets forth optical data for coating 20 alone on a glass substrate (where coating 10 is not present) after HT such as thermal tempering, heat bending, and/or heat strengthening according to certain example embodiments of this invention. Thus, Table 17 sets forth the visible transmission (TY), visible reflectance (RY), reflective a* color value, and reflective b* color value of a coated article including glass substrate 1 and coating 20, from the perspective of the intended viewer shown in FIG. 2, according to certain example embodiments of this invention post-HT.

TABLE 17

Optical Characteristics (Coating 20 on glass; FIG. 2; post-HT)

| | General | Preferred | Most Preferred |
|---|---|---|---|
| $T_{vis}$ (TY): | ≥60% | ≥70% | ≥80% |
| RY: | ≤15% | ≤5% | ≤2% (or ≤1%) |
| a* | −19.0 to +5 | −13.0 to −1.0 | −11.0 to −3.0 |
| b* | −2.0 to +14.0 | +0.5 to +9.0 | +1.0 to +6.0 |

Contrary to Tables 14-15, it can be seen from Tables 16-17 that HT of a glass substrate with coating 20 thereon causes the reflective a* color value to shift in the negative direction (opposite to the a* shift caused by coating 10) from the perspective of the intended viewer. For example, an a* shift from −0.5 to −9 would be a shift in the negative direction because the a* value becomes more negative. As another example, an a* shift from +1 to −8 would be a shift in the negative direction because the a* value becomes more negative.

It can also be seen from Tables 15 and 17 above that in preferred embodiments of this invention, following HT for the FIG. 2 embodiment coating 10 on glass provides a positive reflective a* color value to the viewer whereas coating 20 on glass provides a negative reflective a* color value to the viewer, so that the coatings compensate for each other so that the overall coated article from the perspective of the intended viewer has a more neutral coloration than the coloration caused by coating 10 alone or coating 20 alone on glass. It can also be seen from Tables 15 and 17 above that in preferred embodiments of this invention, after HT, coating 10 on glass provides a negative reflective b* color value to the viewer whereas coating 20 on glass provides a positive reflective b* color value to the viewer, so that the coatings on glass compensate for each other so that the overall coated article from the perspective of the intended viewer has a more neutral coloration than the coloration caused by coating 10 alone or coating 20 alone on glass.

For purposes of example only, the examples below represent different example embodiments of this invention relating to the FIG. 2 embodiment.

Examples for FIG. 2 Embodiment

Comparative Example (CE) 2 is a glass substrate 1 with AR coatings CE2a and CE2b on opposite sides thereof, whereas Example 2 is also a glass substrate 1 with AR coatings Ex. 2a and Ex. 2b on opposite sides thereof as shown in FIG. 1. Layer thicknesses below are in angstroms (Å). Example 2a is similar to coating 20 in FIG. 2, and Example 2b is similar to coating 10 in FIG. 2. "L" stands for layer in the table below, so that for example L2 stands for layer 2, L3 stands for layer 3, and so forth. The layers below move from the glass substrate 1 outward.

TABLE 18

Layer Stacks of Examples

| Example | L2/L2'(TiO$_2$) | L3/L3'(SiO$_2$) | L4/L4'(NbO$_x$) | L4a/L4a'(NbSiO$_x$) | L5/L5'(SiO$_2$) | L6/L6' (ZrSiO$_x$) |
|---|---|---|---|---|---|---|
| Ex. 2a: | 86 Å | 365 Å | 987 Å | 250 Å | 439 Å | 100 Å |
| Ex. 2b: | 85 Å | 393 Å | 1078 Å | 250 Å | 620 Å | 100 Å |
| CE2a: | 86 Å | 365 Å | 987 Å | 250 Å | 439 Å | 100 Å |
| CE2b: | 86 Å | 365 Å | 987 Å | 250 Å | 439 Å | 100 Å |

Comparative Example 2 used the same AR coating on both sides of the glass substrate 1, whereas Example 2 used different AR coatings. A key difference between Example 2 (with coatings 2a and 2b), compared to Comparative Example CE2 (with coatings CE2a and CE2b), on the same glass substrate 1, is the thickness of the silicon oxide based layer 5, 5'. While layers 5 and 5' have the same 439 Å thickness in coatings CE2a and CE2b of Comparative Example 2, layer 5 in Example 2 (Ex. 2b; coating 10; layer 5) at 620 Å is substantially thicker than layer 5' at 439 Å in Example 2 (Ex. 2a; coating 20; layer 5'). As explained above, low index layer 5 in coating 10 is physically thicker than low index layer 5' in coating 20 by at least 75 Å, more preferably by at least 100 Å, more preferably by at least 130 Å, and most preferably by at least 160 Å, with an example range being from about 100-250 Å thicker, or from about 120-210 Å thicker). It has surprisingly and unexpectedly been found that this difference in thickness between layers 5 and 5' provides for a significant change in a* and b* values before and after HT (especially after HT in the FIG. 2 embodiment), and for a different direction of a* color shift upon HT (see optical data below).

Measured monolithically, both before and after thermal tempering (HT), the coatings on the glass substrate of the examples had the following visible reflectance characteristics from the perspective of the intended viewer shown in FIG. 2. Note that all coatings had visible transmission well over 70%, before and after HT. Table 19 sets forth pre-HT data, and Table 20 sets forth post-HT data.

TABLE 19

Optical Data (Pre-HT)

| Parameter | Ex. 2a | Ex. 2b | CE2a | CE2b |
|---|---|---|---|---|
| RY(refl. %): | 0.51% | 0.55% | 0.51% | 0.51% |
| a*: | −0.46 | −2.01 | −0.46 | −0.46 |
| b*: | −0.95 | −0.99 | −0.95 | −0.95 |

After thermal tempering (HT), the example coatings had the following characteristics.

TABLE 20

Optical Data (Post-HT)

| Parameter | Ex. 2a | Ex. 2b | CE2a | CE2b |
|---|---|---|---|---|
| RY(refl. %): | 0.98% | 0.56% | 0.98% | 1.11% |
| a*: | −9.14 | +2.11 | −9.14 | −9.28 |
| b*: | +3.90 | −1.03 | +3.90 | +1.00 |

It can be seen in Table 20 that, after HT, both coatings CE2a and CE2b of Comparative Example 2 on the glass substrate had very negative reflective a* values from the perspective of the intended viewer, and that the HT caused the reflective a* values to shift significantly to the negative for both CE2a and CE2b. In contrast, the change in thickness between layers 5 and 5' mentioned above in Example 2, coupled with a small change in thickness between layers 3, 3', surprisingly and unexpectedly caused the coating Ex. 2a (coating 20) on the glass substrate to have a negative reflective a* value, but the coating Ex. 2b (coating 10) on the glass substrate to have a positive reflective a* value after HT. Moreover, the thickness change also unexpectedly caused the coating Ex. 2a (coating 20) on the glass to realize an a* color shift in the negative direction, but the coating Ex. 2b (coating 10) on the glass to realize an a* color shift in the positive direction. Thus, in Ex. 2 the positive and negative a* values caused by the coatings 10 and 20, respectively, substantially compensate for each other so that the overall coated article (see FIG. 2) with both coatings thereon appears more neutral in color compared to CE1 to the viewer following HT. In other words, after HT Comparative Example 2 has a very negative reflective a* value around −9 from the perspective of the viewer which is much further from the central origin in FIG. 3 (and thus less neutral) compared to the a* value of Example 2 which would be just slightly negative as the −9.14 and +2.11 reflective a* values substantially compensate for each other.

It can also be seen in Table 20 above that, after HT, both coatings CE2a and CE2b of Comparative Example 2 on the glass substrate had positive reflective b* values from the perspective of the intended viewer. In contrast, the change in thickness between layers 5 and 5' mentioned above in Example 2 surprisingly and unexpectedly caused the coating Ex. 2a (coating 20) on the glass substrate to have a positive reflective b* value, but the coating Ex. 2b (coating 10) on the glass substrate to have a negative reflective b* value. Thus, in Ex. 2 the positive and negative b* values caused by the coatings 20 and 10, respectively, substantially compensate for each other so that the overall coated article (see FIG. 1) with both coatings thereon appears more neutral in color compared to CE2 to the viewer. In other words, Comparative Example 2 has a positive reflective b* value from the perspective of the viewer (caused by both coatings causing a positive b* reflective color) which is much further from the central origin in FIG. 3 (and thus less neutral) compared to the reflective b* value of Example 2 where the negative b* value of coating 10 (Ex. 2b) substantially compensates for the positive b* value of coating 20 (Ex. 2a) to make Example 2 appears more neutral to the viewer.

In an example embodiment of this invention, there is provided a method of making a transparent coated glass product, the method comprising: having a coated article comprising a first coating provided on a first side of a glass substrate and a second coating provided on a second side of the glass substrate, so that the glass substrate is located between at least the first and second coatings; and heat treating the coated article at a temperature of at least 580 degrees C. so that the heat treating (i) causes the first coating on the glass substrate to realize a reflective a* color value shift in a positive direction from the perspective of an intended viewer due to the heat treating, and (ii) causes the second coating on the glass substrate to realize a reflective a* color value shift in a negative direction from the perspective of the intended viewer due to the heat treating.

In the method of the immediately preceding paragraph, the heat treating may (i) cause the first coating on the glass substrate to realize a reflective a* color value shift in a positive direction of at least 1.0 (or at least 2.0) from the perspective of an intended viewer due to the heat treating, and (ii) cause the second coating on the glass substrate to realize a reflective a* color value shift in a negative direction of at least 1.0 (or at least 2.0) from the perspective of the intended viewer due to the heat treating.

In the method of any of the preceding two paragraphs, the first and second coatings may be antireflective (AR) coatings.

In the method of any of the preceding three paragraphs, the first coating on the glass substrate has a visible reflectance of no greater than 5% (more preferably no greater than 2%, and most preferably no greater than 1%), and the second coating on the glass substrate has a visible reflectance of no greater than 5% (more preferably no greater than 2%, and most preferably no greater than 1%).

In the method of any of the preceding four paragraphs, all layers of the first and/or second coatings may be transparent dielectric layers.

In the method of any of the preceding five paragraphs, the first coating may comprise, moving away from the glass substrate, a first transparent dielectric layer comprising an oxide of Ti and/or Nb; a first transparent dielectric layer comprising silicon oxide; a second transparent dielectric layer comprising an oxide of Ti and/or Nb; and a second transparent dielectric layer comprising silicon oxide; and the second coating may comprise, moving away from the glass substrate, a first transparent dielectric layer comprising an oxide of Ti and/or Nb; a first transparent dielectric layer comprising silicon oxide; a second transparent dielectric layer comprising an oxide of Ti and/or Nb; and a second transparent dielectric layer comprising silicon oxide. The second transparent dielectric layer comprising silicon oxide of the first coating may be thicker than the second transparent dielectric layer comprising silicon oxide of the second coating by at least 75 Å, more preferably by at least 100 Å, and most preferably by at least 130 Å.

In the method of any of the preceding six paragraphs, the heat treating may comprise thermal tempering, heat bending, and/or heat strengthening.

In an example embodiment of this invention, there is provided a coated article including a first coating and a second coating supported by a glass substrate, the coated article comprising: the first coating provided on a first side of the glass substrate; the second coating provided on a second side of the glass substrate, so that the glass substrate is located between at least the first and second coatings; wherein, from the perspective of a viewer of the coated article, the first coating on the glass substrate has a positive a* reflective color, and the second coating on the glass substrate has a negative a* reflective color.

In the coated article of the immediately preceding paragraph, from the perspective of a viewer of the coated article, the first coating on the glass substrate may have a negative b* reflective color, and the second coating on the glass substrate may have a positive b* reflective color.

In the coated article of any of the preceding two paragraphs, the first and second coatings may be antireflective (AR) coatings.

In the coated article of any of the preceding three paragraphs, the first coating on the glass substrate may have a visible reflectance of no greater than 15% (more preferably no greater than 5%, even more preferably no greater than 2%), and/or the second coating on the glass substrate may have a visible reflectance of no greater than 15% (more preferably no greater than 5%, even more preferably no greater than 2%).

In the coated article of any of the preceding four paragraphs, it is possible that neither the first coating nor the second coating contains a silver based infrared (IR) reflective layer.

In the coated article of any of the preceding five paragraphs, the coated article may have a visible transmission of at least 60%, more preferably at least 70%, more preferably at least 80%, even more preferably at least 90%, and possibly at least 95%.

In the coated article of any of the preceding six paragraphs, all layers of the first coating and/or the second coating may be transparent dielectric layers.

In the coated article of any of the preceding seven paragraphs, the coated article may be heat treated (e.g., thermally tempered, heat strengthened, and/or heat bent).

In the coated article of any of the preceding eight paragraphs, upon heat treatment at a temperature of at least 580 degrees C. (e.g., thermal tempering, heat strengthening, and/or heat bending), the first coating on the glass substrate may be configured to provide a reflective a* color value shift in a positive direction from the perspective of the viewer due to the heat treatment, and the second coating on the glass substrate may be configured to provide a reflective a* color value shift in a negative direction from the perspective of the viewer due to the heat treatment.

In the coated article of any of the preceding nine paragraphs, upon heat treatment at a temperature of at least 580 degrees C. (e.g., thermal tempering, heat strengthening, and/or heat bending), the first coating on the glass substrate may be configured to provide a reflective b* color value shift in a negative direction from the perspective of the viewer due to the heat treatment, and the second coating on the glass substrate may be configured to provide a reflective b* color value shift in a positive direction from the perspective of the viewer due to the heat treatment.

In the coated article of any of the preceding ten paragraphs, the first coating may be provided on the same side of the glass substrate from which the viewer is intended to view the coated article.

In the coated article of any of the preceding eleven paragraphs, the coated article, including the first and second coatings on the glass substrate, may have a visible transmission of at least 70%, a reflective a* value of from −5 to +5, and/or a reflective b* value of from −6 to +6.

In the coated article of any of the preceding twelve paragraphs, the coated article, including the first and second coatings on the glass substrate, may have a visible transmission of at least 70%, a reflective a* value of from −3 to +3, and/or a reflective b* value of from −4 to +4.

In the coated article of any of the preceding thirteen paragraphs, the first coating may comprise, moving away from the glass substrate, a first high index transparent dielectric layer having a refractive index (n) of at least 2.15; a first low index transparent dielectric layer having a refractive index of no greater than 1.8; a second high index transparent dielectric layer having a refractive index (n) of at least 2.15; and a second low index transparent dielectric layer having a refractive index of no greater than 1.8; and the second coating may comprise, moving away from the glass substrate, a first high index transparent dielectric layer having a refractive index (n) of at least 2.15; a first low index transparent dielectric layer having a refractive index of no greater than 1.8; a second high index transparent dielectric layer having a refractive index (n) of at least 2.15; and a second low index transparent dielectric layer having a refractive index of no greater than 1.8. The low index layers of the first and/or second coatings may comprise silicon oxide (e.g., $SiO_2$). The high index layers of the first and/or second coatings may comprise an oxide of titanium and/or niobium. The second low index layer of the first coating may be thicker than the second low index layer of the second coating by at least 75 Å, more preferably by at least 100 Å, even more preferably by at least 130 Å, and in certain preferred instances by at least 160 Å. The second low index layer of the first coating may be thicker than the second low index layer of the second coating by from about 100-250 Å. Moreover, the first and/or second coating may further comprise a medium index transparent dielectric layer having a refractive index (n) of from 1.70 to 2.10 located between the second high index layer and the second low index layer, and the the medium index layer may comprise oxide of Nb and Si. The first and/or second coating may further comprise a medium index transparent dielectric layer having a refractive index (n) of from 1.70 to 2.10 located over the second low index layer, where this medium index layer may comprise oxide of Zr and Si.

In the coated article of any of the preceding fourteen paragraphs, the first coating may comprise, moving away from the glass substrate, a first transparent dielectric layer comprising an oxide of Ti and/or Nb; a first transparent dielectric layer comprising silicon oxide; a second transparent dielectric layer comprising an oxide of Ti and/or Nb; and/or a second transparent dielectric layer comprising silicon oxide; and wherein second coating may comprise, moving away from the glass substrate, a first transparent dielectric layer comprising an oxide of Ti and/or Nb; a first transparent dielectric layer comprising silicon oxide; a second transparent dielectric layer comprising an oxide of Ti and/or Nb; and/or a second transparent dielectric layer comprising silicon oxide. The second transparent dielectric layer comprising silicon oxide of the first coating may be thicker than the second transparent dielectric layer comprising silicon oxide of the second coating by at least 75 Å, more preferably by at least 100 Å, still more preferably by at least 130 Å. The second transparent dielectric layer comprising silicon oxide of the first coating may be thicker than the second transparent dielectric layer comprising silicon oxide of the second coating by from about 100-250 Å. The first and/or second coating may further comprise a layer comprising oxide of Nb and Si between the second transparent dielectric layer comprising an oxide of Ti and/or Nb and the second transparent dielectric layer comprising silicon oxide. The first and/or second coating may further comprise a layer comprising oxide of Zr and Si located over the second transparent dielectric layer comprising silicon oxide.

Once given the above disclosure many other features, modifications and improvements will become apparent to the skilled artisan. Such other features, modifications and improvements are therefore considered to be a part of this invention, the scope of which is to be determined by the following claims.

What is claimed is:

1. A coated article including a first coating and a second coating supported by a glass substrate, the coated article comprising:
    the first coating provided on a first side of the glass substrate;
    the second coating provided on a second side of the glass substrate, so that the glass substrate is located between at least the first and second coatings;
    wherein, from the perspective of a viewer of the coated article, the first coating on the glass substrate has a positive a* reflective color, and the second coating on the glass substrate has a negative a* reflective color.

2. The coated article of claim 1, wherein, from the perspective of a viewer of the coated article, the first coating on the glass substrate has a negative b* reflective color, and the second coating on the glass substrate has a positive b* reflective color.

3. The coated article of claim 1, wherein the first and second coatings are antireflective (AR) coatings.

4. The coated article of claim 1, wherein the first coating on the glass substrate has a visible reflectance of no greater than 15%, and the second coating on the glass substrate has a visible reflectance of no greater than 15%.

5. The coated article of claim 1, wherein the first coating on the glass substrate has a visible reflectance of no greater than 5%, and the second coating on the glass substrate has a visible reflectance of no greater than 5%.

6. The coated article of claim 1, wherein the first coating on the glass substrate has a visible reflectance of no greater than 2%, and the second coating on the glass substrate has a visible reflectance of no greater than 2%.

7. The coated article of claim 1, wherein neither the first coating nor the second coating contains a silver based infrared (IR) reflective layer.

8. The coated article of claim 1, wherein the coated article has a visible transmission of at least 70%.

9. The coated article of claim 1, wherein the coated article has a visible transmission of at least 90%.

10. The coated article of claim 1, wherein all layers of the first coating are transparent dielectric layers.

11. The coated article of claim 1, wherein all layers of the second coating are transparent dielectric layers.

12. The coated article of claim 1, wherein the coated article is heat treated.

13. The coated article of claim 12, wherein the coated article is thermally tempered.

14. The coated article of claim 1, wherein, upon heat treatment at a temperature of at least 580 degrees C., the first coating on the glass substrate is configured to provide a reflective a* color value shift in a positive direction from the perspective of the viewer due to the heat treatment, and the second coating on the glass substrate is configured to provide a reflective a* color value shift in a negative direction from the perspective of the viewer due to the heat treatment.

15. The coated article of claim 1, wherein, upon heat treatment at a temperature of at least 580 degrees C., the first coating on the glass substrate is configured to provide a reflective b* color value shift in a negative direction from the perspective of the viewer due to the heat treatment, and the second coating on the glass substrate is configured to provide a reflective b* color value shift in a positive direction from the perspective of the viewer due to the heat treatment.

16. The coated article of claim 1, wherein the coated article is part of a window, and the first side of the glass substrate is configured to face an exterior of a building in which the window is to be provided.

17. The coated article of claim 1, wherein the coated article, including the first and second coatings on the glass substrate, has a visible transmission of at least 70%, a reflective a* value of from −5 to +5, and a reflective b* value of from −6 to +6.

18. The coated article of claim 1, wherein the coated article, including the first and second coatings on the glass substrate, has a visible transmission of at least 70%, a reflective a* value of from −3 to +3, and a reflective b* value of from −4 to +4.

19. The coated article of claim 1, wherein the first coating comprises, moving away from the glass substrate, a first high index transparent dielectric layer having a refractive index (n) of at least 2.15; a first low index transparent dielectric layer having a refractive index of no greater than 1.8; a second high index transparent dielectric layer having a refractive index (n) of at least 2.15; and a second low index transparent dielectric layer having a refractive index of no greater than 1.8; and
    wherein the second coating comprises, moving away from the glass substrate, a first high index transparent dielectric layer having a refractive index (n) of at least 2.15; a first low index transparent dielectric layer having a refractive index of no greater than 1.8; a second high index transparent dielectric layer having a refractive index (n) of at least 2.15; and a second low index transparent dielectric layer having a refractive index of no greater than 1.8.

20. The coated article of claim 19, wherein the low index layers of the first and second coatings all comprise silicon oxide.

21. The coated article of claim 19, wherein the high index layers of the first and second coatings all comprise an oxide of titanium and/or niobium.

22. The coated article of claim 19, wherein the second low index layer of the first coating is thicker than the second low index layer of the second coating by at least 75 Å.

23. The coated article of claim 19, wherein the second low index layer of the first coating is thicker than the second low index layer of the second coating by at least 100 Å.

24. The coated article of claim 19, wherein the second low index layer of the first coating is thicker than the second low index layer of the second coating by at least 130 Å.

25. The coated article of claim 19, wherein the second low index layer of the first coating is thicker than the second low index layer of the second coating by at least 160 Å.

26. The coated article of claim 19, wherein the second low index layer of the first coating is thicker than the second low index layer of the second coating by from about 100-250 Å.

27. The coated article of claim 19, wherein the first and/or second coating further comprises a medium index transparent dielectric layer having a refractive index (n) of from 1.70 to 2.10 located between the second high index layer and the second low index layer.

28. The coated article of claim 27, wherein the medium index layer comprises oxide of Nb and Si.

29. The coated article of claim 19, wherein the first and/or second coating further comprises a medium index transparent dielectric layer having a refractive index (n) of from 1.70 to 2.10 located over the second low index layer.

30. The coated article of claim 29, wherein the medium index layer comprises oxide of Zr and Si.

31. The coated article of claim 1, wherein the first coating comprises, moving away from the glass substrate, a first transparent dielectric layer comprising an oxide of Ti and/or Nb; a first transparent dielectric layer comprising silicon oxide; a second transparent dielectric layer comprising an oxide of Ti and/or Nb; and a second transparent dielectric layer comprising silicon oxide; and
  wherein the second coating comprises, moving away from the glass substrate, a first transparent dielectric layer comprising an oxide of Ti and/or Nb; a first transparent dielectric layer comprising silicon oxide; a second transparent dielectric layer comprising an oxide of Ti and/or Nb; and a second transparent dielectric layer comprising silicon oxide.

32. The coated article of claim 31, wherein the second transparent dielectric layer comprising silicon oxide of the first coating is thicker than the second transparent dielectric layer comprising silicon oxide of the second coating by at least 75 Å.

33. The coated article of claim 31, wherein the second transparent dielectric layer comprising silicon oxide of the first coating is thicker than the second transparent dielectric layer comprising silicon oxide of the second coating by at least 100 Å.

34. The coated article of claim 31, wherein the second transparent dielectric layer comprising silicon oxide of the first coating is thicker than the second transparent dielectric layer comprising silicon oxide of the second coating by at least 130 Å.

35. The coated article of claim 31, wherein the second transparent dielectric layer comprising silicon oxide of the first coating is thicker than the second transparent dielectric layer comprising silicon oxide of the second coating by from about 100-250 Å.

36. The coated article of claim 31, wherein the first and/or second coating further comprises a layer comprising oxide of Nb and Si between the second transparent dielectric layer comprising an oxide of Ti and/or Nb and the second transparent dielectric layer comprising silicon oxide.

37. The coated article of claim 31, wherein the first and/or second coating further comprises a layer comprising oxide of Zr and Si located over the second transparent dielectric layer comprising silicon oxide.

* * * * *